UNITED STATES PATENT OFFICE.

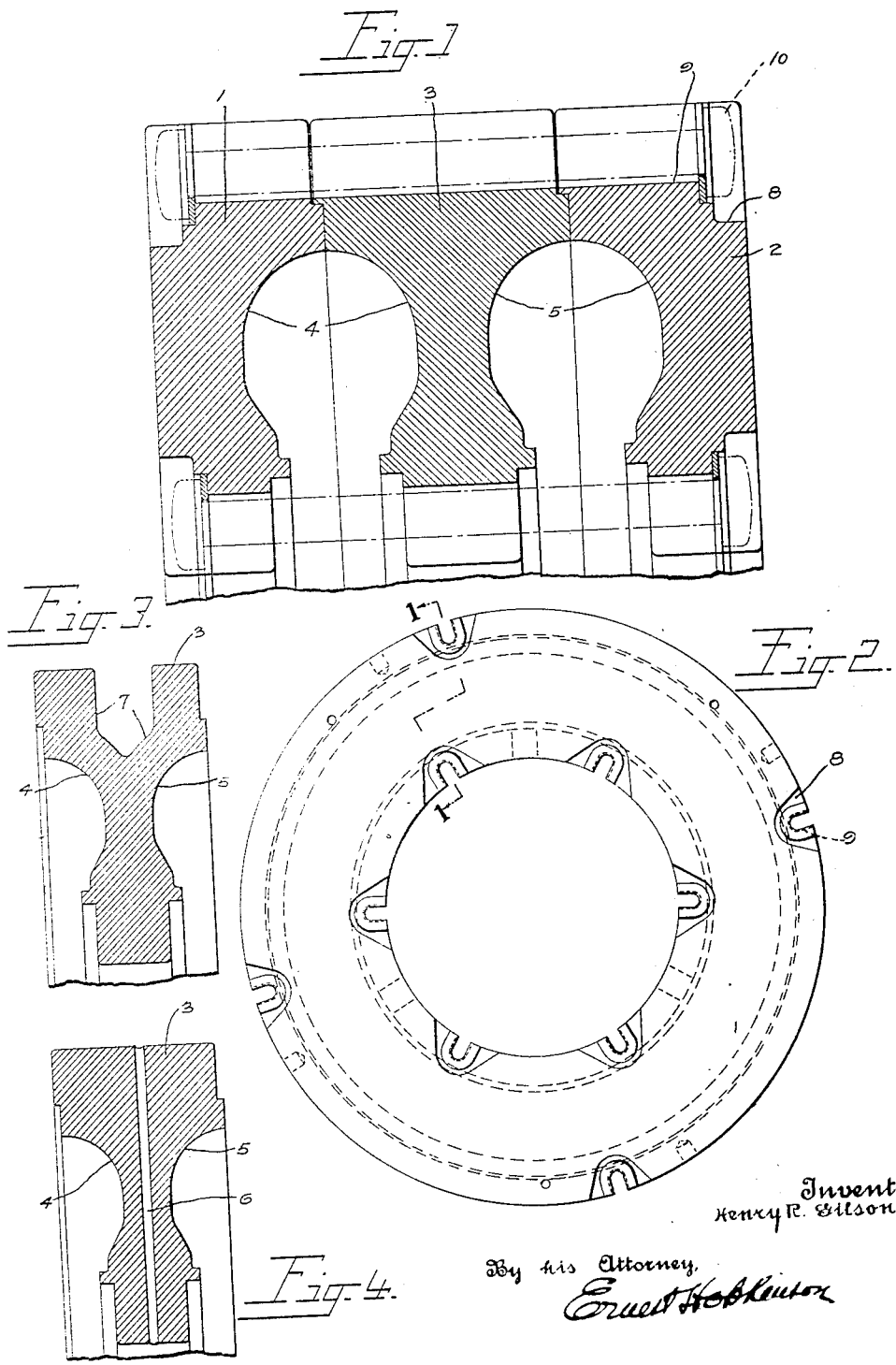

HENRY R. GILSON, OF NEW ROCHELLE, NEW YORK, ASSIGNOR TO THE HARTFORD RUBBER WORKS COMPANY, A CORPORATION OF CONNECTICUT.

DUPLEX MOLD.

1,398,073.     Specification of Letters Patent.     Patented Nov. 22, 1921.

Application filed December 17, 1920. Serial No. 431,374.

*To all whom it may concern:*

Be it known that I, HENRY R. GILSON, a citizen of the United States, residing at New Rochelle, county of Westchester, and State of New York, have invented certain new and useful Improvements in Duplex Molds, of which the following is a full, clear, and exact description.

This invention relates to the manufacture of tires, and more particularly to molds in which they are finally cured.

It is probably the universal practice to cure pneumatic tires in molds having two sections grooved in their meeting faces to define a cavity for the reception of a single carcass. The molds are almost invariably stacked one upon another, twenty or more, on the platen of a hydraulic ram which may be moved upward against a relatively fixed head or cover to clamp the sections of the molds together, steam being admitted to a chamber or jacket that incloses the molds to supply the necessary heat. After curing, the molds are taken out one after another, "broken" or opened to remove the tire (which may be on a core or on a sealing ring) and then reloaded with a green carcass. The molds are then carried back to the press or vulcanizer and the curing operation repeated.

The present invention aims to increase the number of tires that can be cured in a press in one heat, and to economize in the initial cost of equipping a press room with molds.

Essentially, the invention consists in a three or more part mold whose sections are grooved to define two or more cavities so that instead of curing tires in individual molds, the tires may be cured two at a time in a mold.

The invention is illustrated in the accompanying drawings, in which—

Figure 1 is a cross section of the mold of the present invention on line 1—1 of Fig. 2;

Fig. 2 is a plan view of a type thereof shaped to receive clamps with which their sections may be held together;

Figs. 3 and 4 show forms of the intermediate or central section modified in shape to facilitate heating.

Referring to the embodiment of the invention illustrated in the drawings, the mold will be seen to consist of outer sections 1 and 2 and an intermediate section 3. Three is the number of sections preferred because the aggregate weight is not such an increase over the old type of two-section molds that it cannot be handled by present day apparatus and methods. But within the capacity of labor saving devices in use for transporting, loading and unloading the molds, the number of sections of the mold of this invention may be increased to possibly four and still be manipulated like the two-section mold.

The meeting faces of the sections are shaped similarly to those of the two-section molds in use, opposed grooves 4 and 5 being provided to define cavities for the reception of the carcasses or tires to be cured. The intermediate section may be provided with any suitable number of apertures 6 arranged more or less radially and midway between the grooves in its faces as indicated in Fig. 4. The apertures will permit the heating medium (steam), to more quickly penetrate the entire mass of metal and raise it to a curing temperature, and the cure will require less steam. This same end may be attained in a measure by grooving the intermediate section peripherally as indicated at 7, Fig. 3, but this I do not deem desirable unless the intermediate section is made of steel, which is the material prefered for all the sections of the mold.

For curing tires on the cores on which they have been built, the mold sections need not be provided with any clamping means, but where the tires are to be cured under internal fluid pressure with their beads seated on sealing rings, the sections are preferably provided with notches 8, Fig. 1, and slots 9 in their inner or outer or both peripheries to receive bolts (not shown), or dumb-bell shaped clamps 10, the latter being preferred.

From the foregoing description it will thus be seen that the capacity of present two-section molds has been doubled by the use of an intermediate section grooved on both faces and without increasing the weight of the mold more than one-half, probably a little less. The advantages of the mold of the present invention, as already indicated, are that (1) more tires may be cured in a press, (2) less weight has to be lifted and transported in the conveyance of the molds about the press room and in their unloading and loading, and (3) the initial cost of the mold equipment for a given per diem output is decreased. Further, less mold sections have to be handled to cure a given number of tires per diem, and there are less parts likely to warp, pit, and get clogged up so as to require cleaning.

While in the foregoing I have referred only to a tire vulcanizing mold, it is obviously immaterial to what, if any, treatment the mold is subjected. It is to be understood, therefore, that any species of tire mold is within the invention, the use of the invention in "shaping" molds which are not subjected to a vulcanizing heat being contemplated.

The invention is not limited to the precise details of construction shown, and reference should be made to the appended claims for an understanding of the scope of the invention.

Having thus described my invention, what I claim and desire to protect by Letters Patent is:

1. A portable tire mold unit having three or more sections whose contiguous faces are provided with complementary grooves shaped to define a plurality of cavities for the reception of tires, and means on the outermost sections for receiving clamping members of a length less than the distance between the outer surfaces of the outermost mold sections when assembled.

2. A portable tire mold unit having three solid metal sections provided in their meeting faces with opposed grooves defining two cavities for the reception of a pair of tires, the outer faces of the two outside sections being substantially flat to facilitate stacking, said sections being provided with registrable slots terminating in notches in the outermost sections, and clamps insertible in said slots and having headed portions adapted to occupy said notches without protruding beyond the outside surfaces of the outermost mold sections.

3. A portable tire mold unit having three solid metal sections provided in their meeting faces with opposed grooves defining two cavities for the reception of a pair of tires, and clamps of a length overall less than the total thickness of the assembled sections for holding the same together whereby the molds may be handled and stacked with the same facility as single-cavity molds.

Signed at New York, New York, this 13th day of December, 1920.

HENRY R. GILSON.